United States Patent
Demon

(10) Patent No.: US 8,978,550 B2
(45) Date of Patent: Mar. 17, 2015

(54) IN-LINE BALE EJECT SYSTEM

(75) Inventor: Frederik Demon, Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 217 days.

(21) Appl. No.: 13/551,340

(22) Filed: Jul. 17, 2012

(65) Prior Publication Data
US 2013/0019765 A1    Jan. 24, 2013

(30) Foreign Application Priority Data

Jul. 18, 2011   (BE) .................................. 2011/0460

(51) Int. Cl.
*B30B 15/00* (2006.01)
*A01F 15/08* (2006.01)

(52) U.S. Cl.
CPC .................................. *A01F 15/0875* (2013.01)
USPC ............................ 100/188 R; 199/7; 199/218

(58) Field of Classification Search
CPC .......................... A01F 15/0875; B30B 9/3014
USPC .......... 100/7, 188 R, 218; 414/111, 497, 509, 414/511, 512, 517, 525.1; 56/341, 343, 56/361, 474
See application file for complete search history.

(56) References Cited

U.S. PATENT DOCUMENTS

| | | | | |
|---|---|---|---|---|
| 4,549,840 A | * | 10/1985 | Ansbjer | 414/24.5 |
| 4,791,865 A | * | 12/1988 | Naaktgeboren | 100/218 |
| 5,540,144 A | | 7/1996 | Schrag et al. | |
| 5,740,746 A | * | 4/1998 | Ledermann et al. | 111/174 |
| 7,093,537 B2 | * | 8/2006 | Dubois | 100/188 R |
| 7,779,755 B2 | * | 8/2010 | De Rycke et al. | 100/188 R |
| 2005/0172838 A1 | | 8/2005 | Dubois | |
| 2009/0249968 A1 | | 10/2009 | De Rycke et al. | |
| 2012/0266765 A1 | * | 10/2012 | Dumarey | 100/218 |
| 2013/0014655 A1 | * | 1/2013 | Dumarey et al. | 100/218 |
| 2013/0233187 A1 | * | 9/2013 | De Rycke et al. | 100/188 R |

* cited by examiner

*Primary Examiner* — Shelley Self
*Assistant Examiner* — Leonel Vasquez
(74) *Attorney, Agent, or Firm* — Patrick M. Sheldrake; Seyed V. Sharifi T.

(57) ABSTRACT

An ejector system for ejecting bales from a bale-forming chamber of an agricultural baler includes a first and second shuttle assembly. The first shuttle assembly reciprocates when being driven. The first shuttle assembly is adapted for establishing mechanical contact with the second shuttle assembly and for driving the second shuttle assembly during movements of the first shuttle assembly in a reverse direction substantially opposite to the forward direction of the bales in the bale-forming chamber, thus synchronizing reverse movement of both shuttle assemblies.

11 Claims, 3 Drawing Sheets

IN-LINE BALE EJECT SYSTEM

This application claims foreign priority benefits under 35 USC §119(a)-(d) to Belgium Application BE2011/0460 filed Jul. 18, 2011 which is incorporated herein by reference in its entirety.

FIELD OF THE INVENTION

The present invention relates to the field of agricultural balers. More specifically, it relates to an ejector system of a square baler, and to a square baler having such an ejector system.

BACKGROUND OF THE INVENTION

Square balers are agricultural machines in which charges of crop material are fed into a bale-forming chamber and are compacted, typically by means of a reciprocating plunger. The bale-forming chamber usually includes a device for tying bales and a discharge outlet, for example connected to a discharge chute for gently lowering bales onto the field. During normal baling operation, tied bales are ejected from the baler through action of the plunger. However, there is often a need to remove a bale from the bale-forming chamber when normal discharge of the bales is not possible or desirable, e.g. at the end of a baling operation to remove remaining bales from the bale-forming chamber.

Auxiliary ejector systems for unloading bales from the baler, independently of the plunger reciprocation, are known in the art. Such an ejector system can comprise a shuttle assembly, mounted in a wall of the bale-forming chamber, comprising a frame that reciprocates in a direction parallel to the direction of movement of the bales in the bale-forming chamber and independently from the motion of the compacting plunger. Such frame typically has dogs projecting from it to engage with the bales, e.g. gripping the bale during forward strokes of the shuttle assembly, that is to say when it is moving towards the discharge outlet of the bale-forming chamber, and slipping relative to the bale, e.g. the underside thereof, during return strokes. In this way, the reciprocating movement of the shuttle assembly incrementally advances the bales out of the discharge outlet.

The ejector mechanism may be controllable to enable an operator to select whether to discharge only the last bale, nearest the discharge outlet, or both the last bale and the one before it. To achieve this, the dogs can be arranged on the shuttle assembly in a longitudinally extending series and at least some of the dogs may be controllable by the operator, e.g. using a selector assembly so that the controlled dogs may be positioned either to extend into the bale-forming chamber or to be retracted from it.

In EP2108246, an ejector system is disclosed that furthermore does not require the operator to decide on which of the dogs to activate based on prior inspection of the position of the bales in the bale-forming chamber. This system comprises a first shuttle assembly with dogs to engage with the last bale and a second shuttle assembly, reciprocating independently of the first shuttle assembly, with dogs to engage with the next-to-last bale. It is a disadvantage of the ejector system of EP2108246 that it requires multiple actuators, one for a partial bale eject (i.e. where only the last bale is ejected, another bale remaining present in the bale-forming chamber), and another one for a full bale eject (i.e. where all bales are removed from the baler). This is a solution requiring a substantial space, which often is not available in balers.

SUMMARY OF THE INVENTION

The present invention, in any of the embodiments described herein, may provide one or more of the following advantages or meet one or more of the listed objects. Not all advantages or objects are required to be present in each embodiment.

In a first aspect, the present invention provides an ejector system for ejecting bales from a bale-forming chamber of an agricultural baler independently of the movement of a reciprocating compacting plunger for compacting crop material into bales and serially and incrementally moving said bales along the bale-forming chamber in a forward direction towards a discharge outlet for ejection therefrom. The ejector system comprises a first shuttle assembly comprising at least one dog to engage only the last bale positioned closest to the discharge outlet and for advancing the last bale incrementally out of the discharge outlet in response to reciprocation of the first shuttle assembly, and a second shuttle assembly comprising at least one dog positioned to engage at least a previous bale different from the last bale positioned closest to the discharge outlet and for advancing said previous bale incrementally out of the discharge outlet in response to reciprocation of the second shuttle assembly. The ejector system furthermore comprises a first actuator adapted for driving the motion of the first shuttle assembly, and a second actuator adapted for driving the motion of the second shuttle assembly. The first shuttle assembly is adapted for establishing mechanical contact with the second shuttle assembly and for driving said second shuttle assembly during movements of the first shuttle assembly in a reverse direction substantially opposite to the forward direction, so as to synchronize movement in the reverse direction of both shuttle assemblies.

In an ejector system according to some embodiments of the present invention, the first shuttle assembly and the second shuttle assembly may be adapted for being mounted in a wall of a bale-forming chamber.

In an ejector system according to some embodiments of the present invention, each dog may be pivotably mounted on the shuttle assembly to pivot into an extended gripping position during forward movements of the shuttle to advance the bale towards the discharge outlet and to retract during reverse movements of the shuttle assembly to slip relative to the bale. A stop may be associated with each dog to limit the arc through which the dog can pivot.

In some embodiments of the present invention, the first and the second actuators may be hydraulic actuators. The second actuator may be a single-acting actuator. The first actuator may be a double-acting actuator. The fact that a single-acting actuator may be used reduces the cost of an ejector system according to embodiments of the present invention.

In an ejector system according to some embodiments of the present invention, the first shuttle assembly and the second shuttle assembly may both comprise at least one longitudinally extending bar which carries the dogs. The longitudinally extending bars may be placed substantially parallel to the forward direction. The first shuttle assembly may comprise at least one transversally extending bar oriented substantially orthogonal to the at least one longitudinally extended bar of the first shuttle assembly, and substantially orthogonal to the forward direction. The second shuttle assembly may comprise at least one transversally extending bar oriented substantially orthogonal to the at least one longitudinally extended bar of the second shuttle assembly, and substantially orthogonal to the forward direction. The transversally extending bars may be positioned in such way that the at least one transversally extending bar of the first shuttle assembly can contact and drive the at least one transversally extending bar of the second shuttle assembly during movement in the reverse direction of the first shuttle assembly in order to synchronize movement in the reverse direction of the first and second shuttle assemblies.

In a second aspect, the present invention provides a square baler comprising an ejector system according to embodiments of the first embodiment of the present invention. The square baler may comprise a bale-forming chamber having at least one wall, and the first shuttle assembly and the second shuttle assembly may be mounted in a same wall of the bale-forming chamber.

It is an advantage of some embodiments of the present invention that a bale eject system is provided which enables the operator to choose between ejecting only the last bale in the bale-forming chamber and ejecting both the last and next-to-last bales.

It is an advantage of some embodiments according to the present invention that a bale eject system is provided which is compact in design and allows sufficient ground level clearance.

It is an advantage of some embodiments that a bale eject system is provided which can be installed on existing balers without the need for extensive redesign of the machines.

It is an advantage of some embodiments that a low-budget bale eject system is provided which enables the operator to manually switch the bale eject system between a partial ejection mode and a full ejection mode.

Another potential advantage of at least one embodiment is that a low-budget bale eject system is provided that can be efficiently upgraded to a system which enables the operator to switch the bale eject system between a partial ejection mode and a full ejection mode in an automated way.

Still another potential advantage of at least one embodiment according to the present invention that an automated bale eject system for an agricultural baler is provided that reduces the cost.

These and other aspects of the invention will be apparent from and elucidated with reference to the embodiment(s) described hereinafter.

Figure 1:
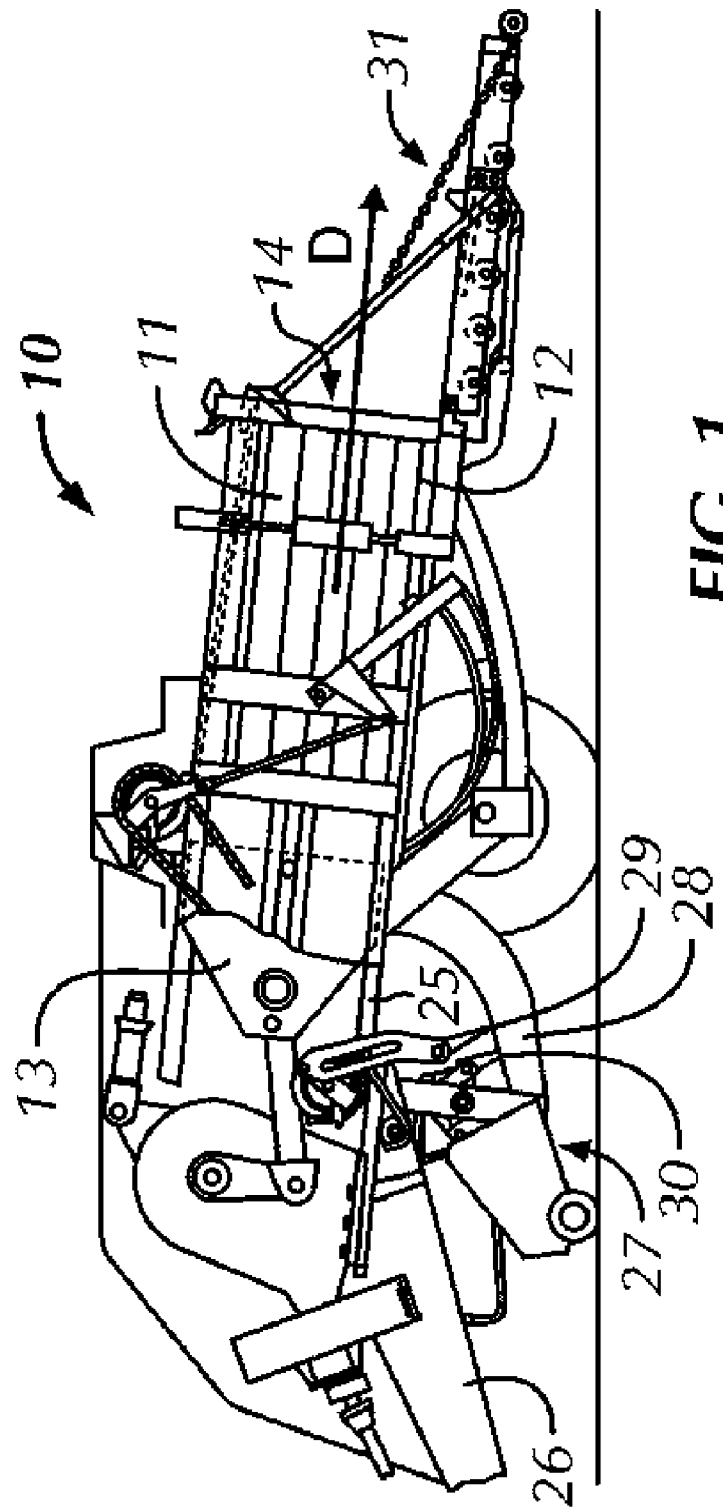
FIG. 1 illustrates a square baler to which an ejector system according to embodiments of the present invention may be applied.

The drawings are only schematic and are non-limiting. In the drawings, the size of some of the elements may be exaggerated and not drawn on scale for illustrative purposes.

In the different drawings, the same reference signs refer to the same or analogous elements.

DETAILED DESCRIPTION OF ILLUSTRATIVE EMBODIMENTS

The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is to be understood that embodiments of the invention may be practiced without these specific details. In other instances, well-known methods, structures and techniques have not been shown in detail in order not to obscure an understanding of this description.

Where in embodiments of the present invention reference is made to agricultural balers, reference is made to machines for forming bales from agricultural crop material, such as forming rectangular bales by any suitable means, e.g. plungers.

Where in embodiments of the present invention reference is made to crop material, reference is made to any suitable type of biomass that can be harvested and packed in bales, such as for example hay, silage, straw or other.

Referring to the drawings, FIG. 1 shows an agricultural baler 10 comprising a frame 25 which is equipped with a forwardly extending tongue 26 at its front end with hitch means (not shown) for coupling the baler 10 to a towing tractor. A pick-up assembly 27 lifts windrowed crop material off the field as the baler 10 is travelled thereover, e.g. while being pulled by a tractor, and delivers such material into the front end of a rearwardly and upwardly curved, charge-forming feeder duct 28. The duct 28 communicates at its upper end with an overhead, fore-and-aft extending bale-forming chamber 11 into which crop charges are loaded by a cyclically operating stuffer mechanism 29. A continuously operating packer mechanism 30 at the lower front end of the feeder duct 28 continuously feeds and packs material into the duct 28 as to cause charges of the crop material to take on and assume the internal configuration of the duct 28 prior to periodic engagement by the stuffer 29 and insertion up into the bale-forming chamber 11. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 11.

A plunger 13 reciprocates in a fore-and-aft direction within the bale-forming chamber 11. Biomass fed via the feeder duct 28 is thereby compacted, e.g. compressed or otherwise treated, so as to form bales in the above-described operation of the agricultural baler 10. Rectangular bales are formed. The formed bales may then be moved forward by the reciprocating motion of the plunger 13 to shift serially and incrementally along the bale-forming chamber 11 in a forward direction D towards a discharge outlet 14, wherefrom the bales may eventually be ejected. The baler 10 may furthermore comprise components such as a knotter mechanism for automatically tying the completed bales with e.g. twine or similar lineal object to make them self-supporting, for example for shipping and storage. Once tied, the bales are discharged from the discharge outlet 14 of the bale-forming chamber 11 onto a discharge in the form of a chute, generally designated 31, for gently lowering the bales near ground level.

In a first aspect, the present invention relates to an ejector system 1 for an agricultural baler 10, more particularly a rectangular baler, i.e. a machine for forming rectangular bales from agricultural crop material.

An ejector system 1 according to embodiments of the present invention may be a separate piece for being built, for example retro-fitted, in an existing agricultural baler. Alternatively, an ejector system 1 according to embodiments of the present invention may be built into an agricultural baler, thus forming an agricultural baler according to a second aspect of the present invention, provided with an ejector system according to embodiments of the present invention.

An ejector system 1 according to embodiments of the present invention is intended for providing alternative means to eject bales from the bale-forming chamber 11, e.g. to provide means for bale ejection independent from the reciprocating plunger 13. Such alternative means for bale ejection can prove useful for unloading remaining bales from the bale-forming chamber 11 when, for example, the baling process has terminated hence the reciprocating plunger movement has stopped. Furthermore, the ejector system 1 can operate in a full or in a partial bale ejection mode, e.g. allowing an operator to choose between unloading only the last bale in the bale-forming chamber 11, i.e. the bale closest to the discharge outlet 14, or more bales, for example the last bale and the next-to-last bale in the bale-forming chamber 11.

An ejector system 1 according to embodiments of the first aspect of the present invention, comprises a first shuttle assembly 2 and a second shuttle assembly 3. Both shuttle assemblies 2, 3 are adapted for reciprocating movement so as to allow propelling of bales along the bale-forming chamber 11. The shuttle assemblies 2, 3 are such that, when the ejector system 1 is built in an agricultural baler, the propelling of the bales along the bale-forming chamber 11 is in a forward direction D towards a discharge outlet 14 for ejection therefrom. The shuttle assemblies 2, 3 may be adapted for mounting in a wall 12 of the bale-forming chamber 11. In embodiments of the present invention (not illustrated in the drawings), the first and second shuttle assemblies 2, 3 can for example both be mounted in a same wall of the bale-forming chamber 11, for example both in a floor 12 of the bale-forming chamber 11. The shuttle assemblies 2, 3 may for example be mounted just retracted from the inner surfaces of the wall 12, in such a way that elements of the shuttle assemblies 2, 3 may interact with bales in the bale-forming chamber 11, e.g. such that dogs 5, 6 may protrude into the bale-forming chamber 11 to engage and shift one or more bales.

In embodiments of the present invention, both shuttle assemblies 2, 3 are adapted for reciprocating independently from the reciprocating plunger 13 and substantially parallel to the forward direction D. The integration of such a reciprocating shuttle assembly 2, 3 in a wall 12, of the bale-forming chamber 11 is well documented in the prior art, for example in U.S. Pat. No. 5,540,144, and will not be discussed further herein for the sake of simplicity and clarity of the disclosure of the present invention, and in order not to obscure the relevant features of embodiments of the present invention.

An ejector system 1 according to embodiments of the present invention further comprises a first actuator 4 adapted for driving the reciprocating motion of the first shuttle assembly 2, for example a hydraulic cylinder having one end attached to the first shuttle assembly 2 and the other end to a bracket (not shown) secured to the baler 10, e.g. to a wall 12, e.g. the floor, of the bale-forming chamber 11. An ejector system 1 according to embodiments of the present invention also comprises a second actuator 7 adapted for driving the reciprocating motion of the second shuttle assembly 3, for example a hydraulic cylinder having one end attached to the second shuttle assembly 3 and the other end to a bracket (not shown) secured to the baler 10, e.g. to a wall 12, e.g. the floor, of the bale-forming chamber 11.

In embodiments of the present invention, the first shuttle assembly 2 comprises at least one dog 5 for engaging the last bale, positioned closest to the discharge outlet 14, and advancing this last bale incrementally out of the discharge outlet 14 in response to reciprocation of the first shuttle assembly 2. The second shuttle assembly 3 comprises at least one dog 6 for engaging at least a previous bale, i.e. a bale different from the last bale, and advancing this previous bale incrementally out of the discharge outlet 14 in response to reciprocation of said second shuttle assembly 3. In embodiments of the present invention, the first shuttle assembly 2 only comprises one or more dogs 5 for engaging with the last bale, and the second shuttle assembly 3 only comprises one or more dogs 6 for engaging with the previous bale. In alternative embodiments, as for example illustrated in FIG. 2, the first shuttle assembly 2 only comprises one or more dogs 5 for engaging with the last bale, and the second shuttle assembly 3 comprises one or more dogs 6 for engaging both with the previous bale and with the last bale. In this case, the dogs 6 on the second shuttle assembly 3 but disposed for engaging with the last bale should be retractable, so as not to interfere with the last bale if a partial bale eject is to be performed, for only ejecting the last bale. In alternative embodiments, not illustrated in FIG. 2, the second shuttle assembly 3 may furthermore comprise additional dogs for engaging more than one previous bales.

The ejector system 1 may have dogs, for example each dog 5, 6, pivotably mounted on the shuttle assemblies 2, 3. Such pivotably mounted dogs may then pivot into an extended gripping position during movements in the forward direction D of the shuttle, in order to advance the bale or bales towards the discharge outlet 14, and then retract during movements of the shuttle assembly in the reverse direction D', i.e. movements opposite to D, in order to slip back relative to the bale. Each dog 5, 6 may furthermore have a stop associated therewith, to limit the arc through which the dog can pivot, e.g. to hold the dogs in the extended gripping position during forward movements.

When the actuators 4, 7 drive the shuttle assemblies 2, 3 in the forward direction D, the dogs 5, 6 are caused to pivot into a substantially upright position, e.g. an upright position, by pushing of the free ends of the dogs against the bales, e.g. pivoting until blocked by stops 32. The dogs may then protrude into the bales in this position and pull the bales along towards the discharge outlet 14. When the actuators 4, 7 complete a reciprocation cycle, driving the shuttle assemblies 2, 3 in a direction D' opposite to the forward direction D, the dogs 5, 6 pivot back to a more horizontal position, which allows slipping of the dogs underneath the bales without pulling the bales along.

It is characteristic for the ejector system 1 according to embodiments of the first aspect of the present invention that the first shuttle assembly 2 is adapted for establishing mechanical contact with the second shuttle assembly 3 during movements of the first shuttle assembly 2 in a reverse direction D', substantially opposite to the forward direction D, so as to synchronize movement in the reverse direction D' of both shuttle assemblies 2, 3.

In embodiments of the present invention, the first and second shuttle assemblies 2, 3 may each comprise one or more, in the embodiment illustrated two, longitudinally extending bars 23, 24, respectively, for being mounted substantially parallel to the forward direction D, and carrying the dogs 5, 6. The longitudinally extending bar(s) 23 of the first shuttle assembly 2 are carrying at least one dog 5 for engaging the last bale, positioned closest to the discharge outlet 14 of a baler, and advancing this last bale incrementally out of the discharge outlet 14 in response to reciprocation of the first shuttle assembly 2. The longitudinally extending bar(s) 24 of the second shuttle assembly 3 are carrying at least one dog 6 for engaging at least a previous bale, i.e. a bale different from the last bale, and advancing this previous bale incrementally out of the discharge outlet 14 in response to reciprocation of said second shuttle assembly 3. Furthermore, both shuttle assemblies 2, 3 of such an ejector system 1 may comprise at least one transversally extending bar 8, 9, for example oriented substantially orthogonal, e.g. orthogonal, to the longitudinally extended bars 23, 24 and, when mounted for operation, to the forward direction D.

In embodiments of the present invention, the ejector system 1 may comprise transversally extending bars 8, 9 which are positioned in such way that the at least one transversally extending bar 8 of the first shuttle assembly 2 can contact and drive the at least one transversally extending bar 9 of the second shuttle assembly 3 during movement in the reverse direction D' of the first shuttle assembly 2 in order to synchronize movement in the reverse direction D' of the first and second shuttle assemblies 2, 3. In this embodiment, the mechanical contact between the first shuttle assembly 2 and the second shuttle assembly 3 is performed by means of the transversally extending bars 8, 9. It is an advantage of the ejector system 1 of this embodiment that it may comprise two shuttle assemblies 2, 3 which are substantially coplanar, e.g. the shuttle assemblies may occupy a common plane, for example a plane in a wall 12, such as a floor, of the bale-forming chamber 11, such that one shuttle assembly, e.g. the second shuttle assembly 3, is encompassed in this plane by the other shuttle assembly, e.g. the first shuttle assembly 2. It is an advantage of this embodiment that it provides a system with larger ground clearance than other systems where the two shuttle assemblies 2, 3 are placed one above the other.

For providing the reciprocating movement of the first and second shuttle assemblies 2, 3, a first and a second actuator 4, 7 may be provided, the first actuator 4 being for providing the movement of the first shuttle assembly 2 in forward direction D and in reverse direction D'. The first actuator 4 may hence be a double acting actuator, for actively actuating the first shuttle assembly 2 in two directions. The second actuator 7 is for providing the movement of the second shuttle assembly 3 in forward direction D. The second actuator 7 may be a single acting actuator, for actively actuating the second shuttle assembly 3 only in one direction. The movement of the second shuttle assembly 3 in reverse direction D' may be provided by the movement of the first shuttle assembly 2 in reverse direction D', actuated by the first actuator 4, which, due to the adaptation for establishing mechanical contact between the first shuttle assembly 2 and the second shuttle assembly 3, formed by the transversally extending bars 8, 9, will also engage the second shuttle assembly 3 in a synchronized movement in reverse direction D'.

While the first actuator 4 needs to be a double-acting actuator, for driving the first shuttle assembly 2 in two directions, this second actuator 7 may comprise a single-acting actuator, for example a single acting hydraulic actuator, which only needs to actively drive the second shuttle assembly 3 in one direction. In particularly advantageous embodiments, such as the exemplary embodiment shown in FIG. 2, the first actuator 4 may be a double acting hydraulic cylinder, while for the second actuator 7 a single acting hydraulic cylinder suffices. Therefore, such an ejector system 1 can be constructed at a lower cost than a system having two double acting hydraulic cylinders, while still providing functionality for both a partial and a full bale ejection.

Figure 2:
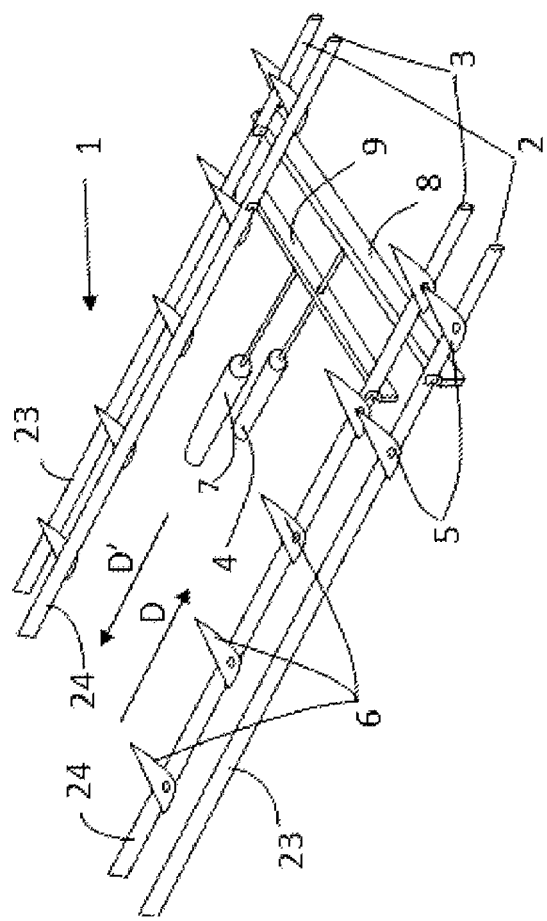
FIG. 2 illustrates a bale ejector system according to an embodiment of the present invention.
Figure 3:
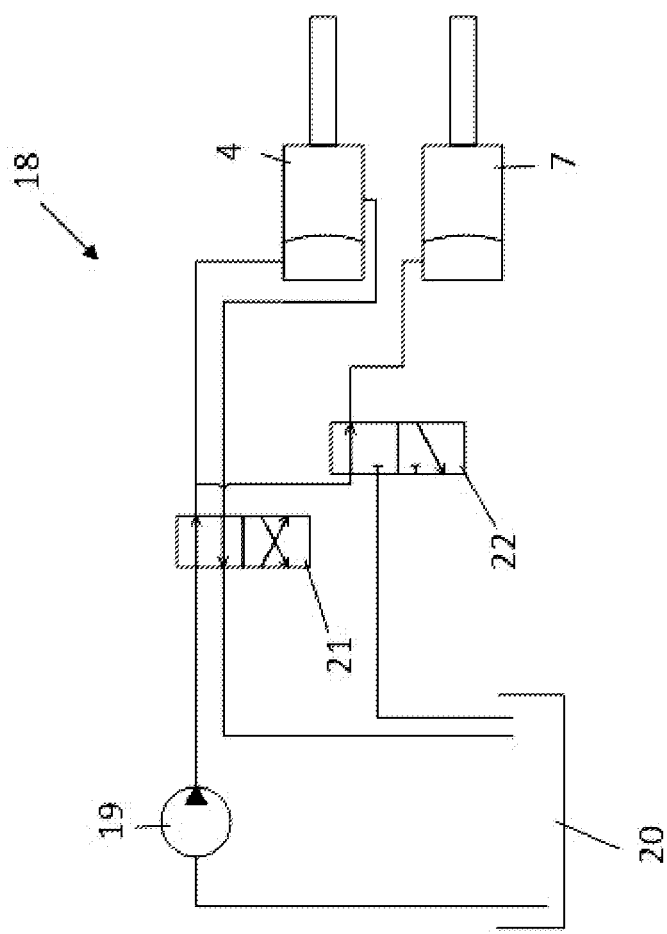
FIG. 3 illustrates a schematic diagram of an exemplary hydraulic control circuit for use with bale ejectors according to embodiments of the present invention.

The ejector system 1 according to embodiments of the present invention, e.g. according to the embodiment of the present invention as illustrated in FIG. 2, may furthermore comprise a hydraulic control circuit 18, of which an exemplary embodiment is depicted in FIG. 3. This hydraulic control circuit 18 may have a hydraulic pump 19, e.g. an unidirectional hydraulic pump, for pumping hydraulic fluid from a fluid reservoir 20 into the circuit. An outlet of the pump 19 and an inlet of the reservoir 20 may be connected to a first directional-control valve 21, e.g. a 4-port 2-position directional-control valve, for example operable by means of a lever or a button, or by means of an electronic control unit, having work ports connected to the first actuator 4. The first directional-control valve 21 may be adapted for switching the flow direction between the rod end and the cap end of the first actuator 4, e.g. the first directional-control valve 21 may have two settings, a first setting in which the fluid flow is directed from the pump 19 to the cap end of the first actuator 4 and from the rod end to the reservoir 20 (this is the setting illustrated in FIG. 5), and a second setting in which the fluid flow is directed from the pump 19 to the rod end of the first actuator 4 and from the cap end to the reservoir 20. This way, the first shuttle assembly 2 will move in the forward direction D in one setting of the first directional-control valve 21 while moving in the reverse direction D' in the other setting. Switching between both settings will therefore result in reciprocation of the first shuttle assembly 2, and thereby in execution of a partial bale eject. The first directional-control valve 21 may furthermore comprise a third, neutral setting (not illustrated in FIG. 5), in which hydraulic fluid flow is inhibited, for disabling the ejector system 1. Alternatively, the ejector system 1 may be disabled by powering down the hydraulic pump 19. The ejector system 1 may furthermore comprise a means for automatic switching between the first and second setting of the first directional-control valve 21, e.g. at a fixed frequency, for example driven by an electric resonator circuit, in order to automate the reciprocating motion of the first shuttle assembly 2 to execute a partial bale eject.

A second directional-control valve 22, e.g. a 3-port 2-position directional-control valve, for example operable by means of a lever or a button, or by means of an electronic control unit, may have a work port connected to the second actuator 7, and be adapted for switching between connecting the second actuator 7 in parallel to the cap end of the first actuator 4 and connecting the second actuator 7 to an inlet of the reservoir 20. The second directional-control valve 22 may e.g. have two settings, a first setting in which the second actuator 7, e.g. the cap end of a single acting cylinder, is connected in parallel to the cap end of the first actuator 4, and a second setting in which fluid is allowed to flow back to an inlet of the reservoir 20. A switch (not illustrated in FIG. 5) is provided for simultaneously changing the settings of the first and second control valves 21, 22. This way, the second shuttle assembly 3 and the first shuttle assembly 2 will be driven synchronously in the first setting, being simultaneously driven in the forward direction D by respectively the first and second actuator 4, 7, and being driven in the reverse direction D' by the first actuator 4 and synchronization of reverse movement of both shuttle assemblies 2, 3 by mechanical contact. In the second setting of the second directional-control valve 22, the fluid in the second actuator 7 is allowed to flow back to the reservoir 20, e.g. when the second shuttle assembly 3 is being driven back in the reverse direction D' by the first shuttle assembly 2, while the second shuttle assembly 3 is not driven forward while the first shuttle assembly 2 is moving in the forward direction D. Therefore, the second directional-control valve 22 may be used, through a lever or an electronic control system attached thereto, to automatically switch the operation of the ejector system 1 from a partial bale eject mode, wherein only the first shuttle assembly 2 is being actively driven in the forward direction D, to a full bale eject mode wherein both shuttle assemblies 2, 3 are being driven synchronously in the forward direction D.

I claim:

1. An ejector system for ejecting bales from a bale-forming chamber of an agricultural baler independently of the movement of a plunger and serially moving said bales along the bale-forming chamber in a forward direction towards a discharge outlet, the ejector system comprising:
   a first shuttle assembly comprising at least one dog to engage only the last bale positioned closest to the discharge outlet and for advancing the last bale incrementally out of the discharge outlet in response to reciprocation of the first shuttle assembly, and a second shuttle assembly comprising at least one dog positioned to engage at least a previous bale different from the last bale positioned closest to the discharge outlet and for advancing said previous bale incrementally out of the discharge outlet in response to reciprocation of the second shuttle assembly, and
   a first actuator adapted for driving the motion of the first shuttle assembly, and a second actuator adapted for driving the motion of the second shuttle assembly,
   wherein the first shuttle assembly is configured for establishing mechanical contact with the second shuttle assembly and said first shuttle assembly driving said second shuttle assembly during movements of the first shuttle assembly in a reverse direction substantially opposite to the forward direction, so as to synchronize movement in the reverse direction of both shuttle assemblies.

2. An ejector system according to claim 1, wherein the first shuttle assembly and the second shuttle assembly are adapted for being mounted in a wall of a bale-forming chamber.

3. The ejector system according to claim 1, wherein at least a majority of the dogs are pivotably mounted to pivot into an extended gripping position during forward movements of the shuttle to advance the bale towards the discharge outlet and to retract during reverse movements of the shuttle assembly to slip relative to the bale.

4. An ejector system according to claim 1, wherein the first and the second actuators are hydraulic actuators.

5. An ejector system according to claim 4, wherein the second actuator is a single-acting actuator.

6. An ejector system according to claim 4, wherein the first actuator is a double-acting actuator.

7. The ejector system according to claim 1, wherein the first shuttle assembly and the second shuttle assembly both comprise at least one longitudinally extending bar which carries dogs.

8. The ejector system according to claim 7, wherein the first shuttle assembly comprises at least one transversally extending bar oriented substantially orthogonal to the at least one longitudinally extended bar of the first shuttle assembly and wherein the second shuttle assembly comprises at least one transversally extending bar oriented substantially orthogonal to the at least one longitudinally extended bar of the second shuttle assembly.

9. An ejector system for ejecting bales from a bale-forming chamber of an agricultural baler independently of the movement of a plunger and serially moving said bales along the bale-forming chamber in a forward direction towards a discharge outlet, the ejector system comprising:
   a first shuttle assembly comprising at least one dog to engage only the last bale positioned closest to the discharge outlet and for advancing the last bale incrementally out of the discharge outlet in response to reciprocation of the first shuttle assembly, and a second shuttle assembly comprising at least one dog positioned to engage at least a previous bale different from the last bale positioned closest to the discharge outlet and for advancing said previous bale incrementally out of the discharge outlet in response to reciprocation of the second shuttle assembly, and
   a first actuator adapted for driving the motion of the first shuttle assembly, and a second actuator adapted for driving the motion of the second shuttle assembly,
   wherein the first shuttle assembly is configured for establishing mechanical contact with the second shuttle assembly and for driving said second shuttle assembly during movements of the first shuttle assembly in a reverse direction substantially opposite to the forward direction, so as to synchronize movement in the reverse direction of both shuttle assemblies; and
   wherein the first shuttle assembly and the second shuttle assembly both comprise at least one longitudinally extending bar which carries dogs;
   wherein the first shuttle assembly comprises at least one transversally extending bar oriented substantially orthogonal to the at least one longitudinally extended bar of the first shuttle assembly and wherein the second shuttle assembly comprises at least one transversally extending bar oriented substantially orthogonal to the at least one longitudinally extended bar of the second shuttle assembly;
   wherein the transversally extending bars are positioned such that the at least one transversally extending bar of the first shuttle assembly can contact and drive the at least one transversally extending bar of the second shuttle assembly during movement in the reverse direction of the first shuttle assembly in order to synchronize movement in the reverse direction of the first and second shuttle assemblies.

10. The ejector system of claim 1, in combination with the agricultural baler.

11. The ejector system of claim 10, wherein the baler comprises a bale-forming chamber having at least one wall, wherein the first shuttle assembly and the second shuttle assembly are mounted in a same wall of the bale-forming chamber.

\* \* \* \* \*